Patented May 5, 1953

2,637,652

UNITED STATES PATENT OFFICE 2,637,652

ALCOHOLIC BEVERAGES AND METHOD

Edmund J. Ryan, Miami, Fla.

No Drawing. Application February 10, 1950,
Serial No. 143,595

10 Claims. (Cl. 99—48)

This invention relates to treatment of alcoholic beverages to improve the taste and other properties and such improved alcoholic beverage products, and in particular to the treatment of such alcoholic beverages as whiskies, wines, cordials, and beer which have been made by fermentation with or without further concentration to increase the alcoholic content, by treating such products with a gaseous activated polymeric oxygen gas such as described and claimed in my copending application Serial No. 142,831 filed February 7, 1950, which is a continuation in part of application Serial No. 50,199 filed September 20, 1948.

According to the present invention alcoholic beverages of various alcohol contents and in various stages of fermentation, purity and aging, are treated with a polymeric oxygen gas preferably a halogen activated polymeric oxygen gas to oxidize certain of the impurities such as fusel oils therein and to destroy certain organic constituents which in effect will terminate any existing fermentation.

Whiskies treated by bubbling the gas hereof therethrough will be found to have improved bouquet, odor and taste. The effect of the gas treatment hereof appears to be a rapid aging of the product without substantial removal of the alcohol content or reduction in proof. Cordials, wines and beer treated by the gas hereof will be resistant to growth of molds and, where the wine or beer contains a suspension of yeast, or is in the process of fermentation thereby, such fermentation will be immediately terminated and the wine and beer thereafter is resistant to further activity by molds or other bacteria derived from storage and will be found to have improved taste and odor.

Proceeding according to the method of the present invention, I pass a gas into the beverage by bubbling the gas into a container containing the same for example in a bottle, barrel, vat, or even passing the gas into a pipeline conveying the beverage. The gas bubbles through the liquid contacting and homogeneously aerating the same and rises in the container, being ultimately separated at the top. Where it is applied through a pipeline, it may be passed in series through a gas separating chamber to prevent continuous entrainment and accumulation in the liquid stream.

A small utility type gas generator as shown in the drawings of my parent application will generate gas at a moderate rate of 1½ liters per minute. This obviously could be modified for a larger or slower flow, variable with the economy of the installation and the quantity of products to be treated. At such flow rate the treating of alcoholic beverages in small quantities of a gallon or less the treatment hereof requires merely bubbling the gas therethrough for a short period of time, variable from a few minutes and generally does not exceed 30, for example, 3 to 30 minutes per gallon.

It is essential in the treatment hereof that the beverage be homogeneously aerated throughout its bulk. Therefore, in treating such beverages in large vat or barrel quantities the treatment requires either a larger flow rate of gas or aeration for longer periods of time to obtain homogeneous contact throughout the larger bulk of liquid. Thus in treatment of a large vat containing several hundred gallons, for example 500 gallons of beer, the gas may be bubbled therethrough for a period of 10 hours accompanied by suitable agitation of the liquid for homogeneous distribution.

The gas used herein is an activated polymeric form of oxygen whose preparation is described in greater detail in my co-pending applications above referred to. Reviewing the process of forming the gaseous agent, warm substantially pure oxygen is first subjected under pressure to radiant energy such as ultra-violet light having a wave length of 2,000 to 4,800 angstrom units. Thereafter the gas is treated by high voltage discharge of the order of at least 5,000 volts and preferably higher, such as 11,000 to 18,000 volts, but higher voltages may be used. During these treatments the oxygen gas is maintained under a substantial pressure of at least 10 pounds gauge; higher pressures generally tending to a greater degree of polymerization. Generally a pressure in the range of 10 to 50 pounds gauge will be used but higher pressures in the range of 100 pounds to 10,000 atmospheres may be used for very large installations where rugged constructions of apparatus to withstand such pressures are economical. The oxygen gas is also heated to a temperature generally exceeding 100° F., operation in the temperature range of 100° to 200° being generally satisfactory; however, higher temperatures up to 600° F. will operate.

The oxygen gas so treated in partially polymerized form is generally thereafter modified by halogen containing catalyst, or according to a modification hereof the oxygen may be modified in the presence of halogen with or without subsequent treatment with a halogen containing catalyst.

The halogen containing catalyst consists of a concentrated solution in water of halogen either as pure elemental halogen dissolved in water, or a water soluble inorganic halogen salt dissolved in water. The halogen may be either elemental halogen (chlorine, fluorine, bromine, or iodine) or soluble inorganic salts thereof, such as sodium, potassium, lithium, magnesium, barium, strontium or calcium, halides, halates, halites, hypohalites, or oxy-halides. Specific examples of an inorganic halogen salt or element are sodium chloride, sodium bromide, sodium fluoride, sodium iodide, free elemental iodine, free elemental chlorine, free elemental bromine, free elemental fluorine, sodium hypo-iodite, sodium hypo-fluorite, potassium tri-iodide, potassium hypo-chlorite, potassium bromate, sodium acid fluoride, sodium periodate, sodium hypo-chlorite, sodium acid fluoride, lithium periodate, sodium hypochlorite, chlorine di-oxide, calcium iodide, barium chloride, strontium chlorate, magnesium chloride. Mixtures of such halogen materials in many instances are desirably used. The elemental halogen or salt thereof is generally used as a concentrated solution in water. In normal operation the aqueous solution is saturated with respect to the free halogen or salt thereof and, to maintain the saturation, an excess of salt or element halogen is usually present as a slurry or suspension in the water, but this is not necessary since any concentrated solution of halogen or salt thereof in water will operate and the concentration of halogen material may vary anywhere from 25% up to complete saturation based upon the quantity of the particular halogen material which will dissolve.

Other substantially inert salts may be used in the catalyst solution primarily to raise the gravity of the halogen containing liquid to give optimum washing contact with the oxygen polymer passed therethrough and also to give improved solubility effects of the halogen. Such inert salts as the soluble sulphates are suitable and the liquid in which the halogen is dissolved may be such as already have a natural halogen content as well as lesser quantities of other salts, for example natural halogen-containing brines including ordinary sea water. It will be understood that sea water when used will generally be further fortified with the halogen to substantial saturation.

The oxygen gas after exposure to ultra violet light and high voltage discharge, at high pressures and elevated temperature contains at least 60% and generally more, such as about 100% polymeric oxygen. For example, analysis has shown that such gas may contain less than 5% of diatomic oxygen. This gas is itself a powerful oxidizing agent and may be used directly in the treatment of beverages as described herein; however, I prefer to further activate this gas by imparting thereto a minor halogen content.

In forming the halogen activated polymeric oxygen gas, the pure oxygen, partially polymerized by subjection to radiant energy and high voltage discharge, is bubbled through the saturated aqueous halogen containing catalyst in the pressure and temperature range given above and at a rate variable with the size of the apparatus. For example, for forming small quantities a useful rate is about ½ to 10 liters of gas per liter of aqueous catalyst per minute.

Such gas may be used directly as produced or may be compressed and/or liquified, stored and re-evaporated for subsequent use. However, it is preferred to use the gas directly as obtained from the catalytic treatment.

The gas obtained prior to catalytic treatment is already substantially polymeric so far as I am aware. The polymerized gas may contain a substantial quantity of ozone, but it is believed further to contain substantial quantities of higher polymers of oxygen as well as some ordinary pure oxygen. After passing through the halogen catalyst the gas is highly activated and it appears probable that the halogen of the salt in the catalyst solution itself is oxidized to free halogen and some of which is vaporized and entrained by the polymerized oxygen gas. However, the activity of the gas appears to indicate that the polymer containing oxygen is further polymerized in the catalytic contact to increase the quantity of higher polymeric oxygen therein. It is also possible that the halogen itself vaporized into the polymerized oxygen gas stream is also oxidized and may be present in the form of a halogen oxide. Whatever the case is, I am not certain, and therefore do not intend to be limited by any theory as to the exact chemical reactions which do take place in the several reaction stages. It appears at present most probable that the gas in addition to polymeric oxygen with some content of higher polymers of oxygen as well as ozone, further contains some halogen which may be free or oxidized. I therefore use the term "halogen activated polymeric oxygen" to define the gas herein obtained.

The oxygen gas after ultra violet light treatment and high voltage discharge, prior to halogen treatment, is already polymerized and probably contains substantial quantities of ozone but apparently contains some higher oxygen polymer other than normally contained in ozone since it is slightly more active. However, such gas is much more highly activated by the subsequent catalysis upon passage through the halogen containing liquid. Applicant therefore prefers the method described herein for producing polymeric oxygen prior to passing the same through the halogen catalyst. However, it is possible to further activate ordinary ozone formed from oxygen by passing such ozone through the halogen catalyst.

Thus, within the scope of the present invention, applicant first produces a polymeric oxygen gas preferably by subjecting the oxygen gas under heat and pressure first to ultra violet light and then to high voltage discharge, but other sources of polymeric oxygen such as an ordinary ozone generator may be substituted as the source of the polymeric oxygen. The polymeric oxygen either obtained by the preferred procedure or ozone, as produced from oxygen, is passed through the halogen containing catalyst and is then ready for introduction into alcoholic beverages for purification thereof according to the present invention.

In a modification of the present invention it is also possible to introduce pure halogen preferably gaseous into the oxygen prior to polymerization thereof so that the polymeric oxygen after subjecting to ultra-violet light and high voltage discharge, contains from 1 to 25%, preferably 5 to 15% of halogen either as free halogen or halogen in an oxidized and possibly polymerized form or combination thereof.

As indicated above, the period of treatment of the gas will depend somewhat on the volume of liquid to be treated but it will be also variable with the objective to be obtained and with the ultimate taste to be imparted. For example, where the primary objective is to treat a fermenting liquid, such as light wine or beer, still in the process of fermentation, and merely for the purpose of terminating such fermentation, it is not necessary to bubble the gas through the liquid for more than a few minutes. Thus a gallon of beer is satisfactorily treated by bubbling the gas therethrough at a rate of about 1½ liters per minute for 3 to 5 minutes. Such treatment suffices to destroy the living yeast or molds active in the beverage during fermentation. However, where it is desirable to effect substantial oxidation and some esterification of higher alcohols contained in relatively high alcohol proof beverages, such as whiskeys, to improve the taste or bouquet and diminish the bite thereof, the gas will be bubbled therethrough for a somewhat longer period of time depending upon the ultimate taste to be desired. For example, in gallon quantities, the gas may be bubbled therethrough for a period of 15 to 30 minutes at a rate of 1½ liters per minute. Obviously where larger quantities of liquid are to be treated with the substance, the flow rate of the gas may be increased. For purposes of adequately contacting such larger quantities, the gas will also be passed therethrough for a longer period of time and homogeneously distributed throughout by agitation. For such purpose the gas will be bubbled therethrough from 1 to 10 hours. Thus it will appear that considerable variation is possible in the length of exposure, depending not only on the rate of flow of the gas in the volume of liquid to be treated and the results to be achieved including not only termination of fermentation but also wide variation of taste to be imparted.

While the preferred method of aerating the beverage for the several purposes as described above is by merely bubbling the gas through the liquid, suitable contact may be effected either by simultaneously spraying the gas and the liquid to achieve adequate aeration thereof, or where the beverage is to be carbonated, the gas may be mixed with the carbon dioxide actually added to the beverage. Alternatively, the gas may also be injected into the beverage under pressure and the container immediately closed whereby it is stored under pressure of the gas.

The following examples illustrate the practice of the present invention:

*Example I.*—A barrel of Kentucky bourbon whiskey immediately after being placed in the container was aerated by bubbling a gas formed by polymerizing oxygen at a temperature of 150° F. and a pressure of 40 lbs. gauge while subjecting the same to ultra-violet light having a wave length of approximately 2500 angstrom units and to a high voltage discharge of about 15,000 volts and thence through a catalyst consisting of a saturated solution in sea water of sodium hypochlorite at a flow rate of 1½ liters per minute of gas. The gas was bubbled over a period of one hour through the whiskey through a long tube inserted into the bottom through the barrel opening and the gas bubbled therethrough is allowed to escape from the top. After this treatment the whiskey had a smooth taste and good bouquet, the equivalent of whiskey which has been aged in a barrel for a period of over two years. The raw whiskey prior to this treatment had the typical raw taste and bite of an unaged whiskey.

*Example II.*—A gallon of blended whiskey composed of neutral spirits and other aged whiskeys having an original proof of 82.8 and a fusel oil content of 44 with a slightly raw taste including substantial bite, was aerated by bubbling a gas therethrough formed as described in Example I at a rate of 1½ liters per minute. The following table shows the changes which take place in terms of fusel oil content:

| Time | Proof | Fusel Oil |
| --- | --- | --- |
| 0 (control) | 82.8 | 44 |
| 5 min | 81.4 | 434 |
| 10 min | 82.0 | 241 |
| 15 min | 82.4 | 144 |
| 20 min | 82.6 | 55 |
| 25 min | 82.6 | 35 |

The product was exceedingly smooth having all the characteristics of aged whiskey with a very fine bouquet. While I do not know exactly what reaction takes place and do not intend to be limited to any theory, apparently one of the early actions of the gas essentially oxidizing in nature is to convert large portions of fusel oil to esters at the expense of some of the ethyl alcohol and finally by further oxidation to reduce the quantity of esters. Thus, the action appears to be a smoothening of the whiskey to convert higher alcohols to esters and then reduction of esters.

*Example III.*—The same whiskey treated as in Example II substituting a gas formed by polymerizing a mixture of oxygen and chlorine comprising 98% oxygen and 2% chlorine without further catalytic treatment, the polymerization being effected by passing the gaseous mixture through ultra-violet light maintained at a wave length and then through a high voltage discharge treatment at raised temperatures and pressures as described in Example I, at a similar flow rate of 1½ liters per minute. The treatment by bubbling the gas therethrough for a total 25 minutes gave a fusel oil content of substantially the same as the original. However, the taste and bouquet of the whiskey was considerably improved over the original.

*Example IV.*—Beer in a thousand gallon vat after having fermented for a desirable period but still containing a substantial quantity of fermenting yeast is aerated over a period of three hours by passing therein the activated gas hereof consisting of a gas formed by polymerizing pure oxygen at a temperature of 150° F. and pressure of 40 lbs. gauge, by first subjecting the same to ultra violet light of 2500 angstrom units and then to a high voltage discharge of 15,000 volts and finally passing the gas through a catalyst consisting of a saturated solution in water of sodium hypo-chlorite. It was found after this treatment that all fermentation had stopped and the beer was not subject to further changes in taste by further fermentation either by the normal inocculant yeast or wild yeast.

*Example V.*—A champagne which has re-fermented to acquire a substantial pressure and is in the process of fermentation with the pressure continuously increasing as stored in small containers is opened to remove some of the sediment and re-pressured to 20 lbs. per square inch pressure with the halogen activated polymeric gas as described in Example III, re-corked and stored under such pressure. After six months it was found that the pressure is slightly reduced, that no additional sediment was formed in the bottle and the champagne has a smoother and sweeter taste as compared to a relatively sour, sediment containing, control sample of the same stock which was not so treated. The improvement of such wine by removal of sour tastes tends to suggest improved quality. For example a cheaper sec grade wine suggests improved quality of the character of cuvée and brut types.

*Example VI.*—The whiskey as in Examples II and III was treated for 25 minutes by bubbling gas therethrough which had not been treated with catalyst. The gas contained between 60 and 95% of polymeric oxygen and no halogen. The task was in that it was smoother and had no bite; the whiskey had an improved bouquet but the actual fusel oil content was not analyzed.

Various modifications will occur to those skilled in the art, for example, it is believed that other alcoholic beverages than those set forth above may be satisfactorily improved by the present treatment.

Thus it is possible to control the activity of the gas to some extent by modifying it by blending with inert gases such as nitrogen or even carbon dioxide. Where inert gases are added, it is preferred to use such inert gases as have been activated as described in my parent application.

It is accordingly intended that the several examples set forth herein be regarded as exemplary and not limiting except as defined in the claims appended hereto.

I claim:

1. The method of treating an alcoholic beverage comprising aerating the same with a halogen activated polymeric oxygen gas, formed by first subjecting oxygen gas to ultra-violet light in the wave length of 2,000 to 4,800 A. U. units, then subjecting the gas to a high voltage discharge in the range of 11,000 to 18,000 volts under pressures exceeding 10 pounds gauge and temperatures in the range of 100 to 600° F. to form an oxygen gas of which a substantial portion is in a polymeric form, and then passing this gas through a concentrated aqueous solution of a halogen substance selected from the group consisting of elementary halogen and water soluble salts thereof.

2. The method of improving the taste of whiskey comprising aerating the same with halogen activated polymeric oxygen gas, formed by first subjecting oxygen gas to ultra-violet light in the wave length of 2,000 to 4,800 A. U. units, then subjecting the gas to a high voltage discharge in the range of 11,000 to 18,000 volts under pressures exceeding 10 pounds gauge and temperatures in the range of 100 to 600° F. to form an oxygen gas of which a substantial portion is in a polymeric form, and then passing this gas through a concentrated aqueous solution of a halogen substance selected from the group consisting of elementary halogen and water soluble salts thereof.

3. The method of improving the taste of wine comprising aerating the same with a halogen activated polymeric oxygen gas, formed by first subjecting oxygen gas to ultra-violet light in the wave length of 2,000 to 4,800 A. U. units, then subjecting the gas to a high voltage discharge in the range of 11,000 to 18,000 volts under pressures exceeding 10 pounds gauge and temperatures in the range of 100 to 600° F. to form an oxygen gas of which a substantial portion is in a polymeric form, and then passing this gas through a concentrated aqueous solution of a halogen substance selected from the group consisting of elementary halogen and water soluble salts thereof.

4. The method of improving the taste of a beer by aerating the same with a halogen activated polymeric oxygen gas, formed by first subjecting oxygen gas to ultra-violet light in the wave length of 2,000 to 4,800 A. U. units, then subjecting the gas to a high voltage discharge in the range of 11,000 to 18,000 volts under pressures exceeding 10 pounds gauge and temperatures in the range of 100 to 600° F. to form an oxygen gas of which a substantial portion is in a polymeric form, and then passing this gas through a concentrated aqueous solution of a halogen substance selected from the group consisting of elementary halogen and water soluble salts thereof.

5. The process of terminating fermentation of a beer comprising aerating the same with a halogen activated polymeric oxygen gas, formed by first subjecting oxygen gas to ultra-violet light in the wave length of 2,000 to 4,800 A. U. units, then subjecting the gas to a high voltage discharge in the range of 11,000 to 18,000 volts under pressures exceeding 10 pounds gauge and temperatures in the range of 100 to 600° F. to form an oxygen gas of which a substantial portion is in a polymeric form, and then passing this gas through a concentrated aqueous solution of a halogen substance selected from the group consisting of elementary halogen and water soluble salts thereof.

6. An alcoholic beverage which has been aerated with a halogen activated polymeric oxygen gas, formed by first subjecting oxygen gas to ultra-violet light in the wave length of 2,000 to 4,800 A. U. units, then subjecting the gas to a high voltage discharge in the range of 11,000 to 18,000 volts under pressures exceeding 10 pounds gauge and temperatures in the range of 100 to 600° F. to form an oxygen gas of which a substantial portion is in a polymeric form, and then passing this gas through a concentrated aqueous solution of a halogen substance selected from the group consisting of elementary halogen and water soluble salts thereof.

7. A whiskey which has been aerated with a halogen activated polymeric oxygen gas, formed by first subjecting oxygen gas to ultra-violet light in the wave length of 2,000 to 4,800 A. U. units, then subjecting the gas to a high voltage discharge in the range of 11,000 to 18,000 volts under pressures exceeding 10 pounds gauge and temperatures in the range of 100 to 600° F. to form an oxygen gas of which a substantial portion is in a polymeric form, and then passing this gas through a concentrated aqueous solution of a halogen substance selected from the group consisting of elementary halogen and water soluble salts thereof.

8. A carbonated alcoholic beverage which has been aerated with a halogen activated polymeric oxygen gas, formed by first subjecting oxygen gas to ultra-violet light in the wave length of 2,000 to 4,800 A. U. units, then subjecting the gas to a high voltage discharge in the range of 11,000 to 18,000 volts under pressures exceeding 10 pounds gauge and temperatures in the range of 100 to 600° F. to form an oxygen gas of which a substantial portion is in a polymeric form, and then passing this gas through a concentrated aqueous solution of a halogen substance selected from the group consisting of elementary halogen and water soluble salts thereof.

9. A beer which has been aerated with a halogen activated polymeric oxygen gas, formed by first subjecting oxygen gas to ultra-violet light in the wave length of 2,000 to 4,800 A. U. units, then subjecting the gas to a high voltage discharge in the range of 11,000 to 18,000 volts under pressures exceeding 10 pounds gauge and temperatures in the range of 100 to 600° F. to form an oxygen gas of which a substantial portion is in a polymeric form, and then passing this gas through a concentrated aqueous solution of a halogen substance selected from the group consisting of elementary halogen and water soluble salts thereof.

10. A wine which has been aerated with a halogen activated polymeric oxygen gas, formed by first subjecting oxygen gas to ultra-violet light in the wave length of 2,000 to 4,800 A. U. units, then subjecting the gas to a high voltage discharge in the range of 11,000 to 18,000 volts under pressures exceeding 10 pounds gauge and temperatures in the range of 100 to 600° F. to form an oxygen gas of which a substantial portion is in a polymeric form, and then passing this gas through a concentrated aqueous solution of a halogen substance selected from the group consisting of elementary halogen and water soluble salts thereof.

EDMUND J. RYAN.

References Cited in the file of this patent

UNITED STATES PATENTS

| Number | Name | Date |
|---|---|---|
| 2,050,908 | Willkie | Aug. 11, 1936 |
| 2,064,330 | Yocum | Dec. 15, 1936 |
| 2,086,080 | Herrick | July 6, 1937 |
| 2,145,243 | Bagby | July 31, 1939 |